United States Patent [19]

Ballun

[11] Patent Number: 5,765,595
[45] Date of Patent: Jun. 16, 1998

[54] AIR/VACUUM VALVE THROTTLING APPARATUS

[75] Inventor: John V. Ballun, Elmhurst, Ill.

[73] Assignee: Val-Matic Valve and Manufacturing Corp., Elmhurst, Ill.

[21] Appl. No.: 779,007

[22] Filed: Jan. 2, 1997

[51] Int. Cl.$^6$ ............................................. F16K 17/168
[52] U.S. Cl. ............................ 137/881; 137/202; 137/526
[58] Field of Search ................................... 137/202, 526, 137/513.7, 881

[56] References Cited

U.S. PATENT DOCUMENTS

| | | | |
|---|---|---|---|
| 1,336,280 | 4/1920 | Carroll | 137/526 |
| 1,509,508 | 9/1924 | Grunwald et al. | 137/599 |
| 2,405,241 | 8/1946 | Smith | 137/526 |
| 3,605,132 | 9/1971 | Lineback | 137/526 X |
| 4,834,621 | 5/1989 | Hall et al. | |
| 4,941,503 | 7/1990 | Hubner | 137/526 X |
| 4,998,554 | 3/1991 | Rogers | 137/526 X |

OTHER PUBLICATIONS

Val-Matic Bulletin No. 100WS revised Aug. 1, 1989 entitled: "Well Service" Air Valves.
Val-Matic Drawing No. VM-S1400VB dated Dec. 23, 1985 entitled Threaded Style Vacuum Breaker.
Val-Matic Drawing No. VMS-506 dated Apr. 1, 1966 entitled Typical Throttling Device.

Primary Examiner—Gerald A. Michalsky
Attorney, Agent, or Firm—Hill & Simpson

[57] ABSTRACT

An air/vacuum valve throttling device capable of use with an air/vacuum valve in a piping installation is provided. The throttling device has a body with an interior and a number of ports. A vent/admit port connectable to the air/vacuum valve is provided. An outlet port and an air inlet port are also located in the body. A shaft extends from outside the body into the interior and has a plug connected to an end of the shaft so that the plug is located within the interior of the body. The shaft and plug are constructed and arranged to extend into the outlet port. The plug position is adjustable. A rod is also provided having a plug at one end extending into the interior and a retainer at another end outside the interior. A bushing in the air inlet port having an opening to allow the rod to pass therethrough, and a spring is used for resiliently centering the rod in the air inlet port.

22 Claims, 4 Drawing Sheets

5,765,595

AIR/VACUUM VALVE THROTTLING APPARATUS

BACKGROUND OF THE INVENTION

1 Field of the Invention

The present invention relates generally to air/vacuum valves and more specifically to air/vacuum valves used to exhaust and admit air in vertical turbine pump discharge piping.

2 Description of the Related Art

The dual function of an air/vacuum valve used in a basic service operation is to exhaust the air present in a pump column before the air is able to enter the system during pump startup and to allow air to re-enter the pump column after pump shutdown. A field adjustable throttling device is needed to control the air exhaust rate based on the particular characteristics of the pumping application. A typical installation in shown in FIG. 1.

The throttling device should control the exhaust flow during pump startup so that air is not pumped into the piping system, but at the same time should also prevent rapid pressure rises in the pump column when the water column strikes the closed pump discharge check valve.

Additionally, the valve should have unrestricted reverse air flow after pump shutdown to allow rapid water column drop and to prevent a vacuum. Rapid water column drop is needed so that the pump will not be inadvertently restarted while the pump is rotating in the reverse direction, causing damage. The prevention of vacuum formation is necessary to prevent damage to the pump and piping seals along with preventing the collapse of thin-walled steel pipe. To this end, two prior art methods are currently used in the water industry.

For many decades, relatively simple throttling devices were mounted on top of an air/vacuum valve so that the exhaust flow rate could be controlled by adjusting a plug position.

The limitation of these devices is that if the exhaust flow is restricted, the reverse air flow needed to prevent a vacuum in the pump column is also restricted.

A different design is disclosed in U.S. Pat. No. 4,834,621 wherein the plug is allowed to be responsive to the vacuum condition and to open fully to allow a greater passageway in the reverse direction. However, in the commercial embodiment of this arrangement, the exhaust of the valve is usually piped several feet to an open drain or back to the water source because water may also be discharged when exhausting air. Since the exhaust port is used for both exhausting and admitting air, the reverse air flow is restricted by this piping. Also, if the exhaust piping becomes submerged, its ability to break a vacuum is virtually eliminated.

Thus, the need has arisen for an improved throttling device that is capable of providing a greater volume of free air to be admitted directly into the device instead of through a long run of discharge piping. Also, the need has arisen for an improved throttling device that is designed so that a blockage caused by submergence of the discharge piping will not prevent the valve from admitting air. Finally, the need has arisen for an improved throttling device that provides the capability of monitoring the operation of the valve through simple observation to determine if service is needed.

SUMMARY OF THE INVENTION

It is, therefore, an object of the present invention to provide an improved throttling device for an air/vacuum valve that provides a greater volume of free air to be admitted directly into the device instead of through a long run of discharge piping.

It is another object of the present invention to provide an improved air/vacuum valve throttling device capable of admitting air despite a blockage or submergence of the discharge piping.

In addition, it is an object of the present invention to provide an air/vacuum valve throttling device in which the operation of the valve can be monitored through simple observation to determine if service is needed.

To this end, an air/vacuum valve throttling device capable of use with an air/vacuum valve in a piping installation is provided. The throttling device has a hollow member having a plurality of ports in communication with each other; a first of the ports configured to be secured to the air inlet/outlet port of the air/vacuum valve to allow for the passage of air into and out of the air/vacuum valve through the body and the first port. The throttling device also has a first restriction device adjustably positionable relative to a second of the ports to allow for a controlled rate of air flow through the second port in at least an outflow direction, and a second restriction device movably positioned relative to a third of the ports to allow for air flow through the third port in at least an inflow direction.

BRIEF DESCRIPTION OF THE DRAWINGS

FIG. 1 also includes arrows indicating flow to show the dual function of the air/vacuum valve by illustrating exhausting the air present in the pump column before pump start up.

FIG. 2 also includes arrows indicating flow to show the dual function of the air/vacuum valve by illustrating air re-entry to the pump column after pump shut down.

DETAILED DESCRIPTION OF THE PREFERRED EMBODIMENTS

Figure 1:
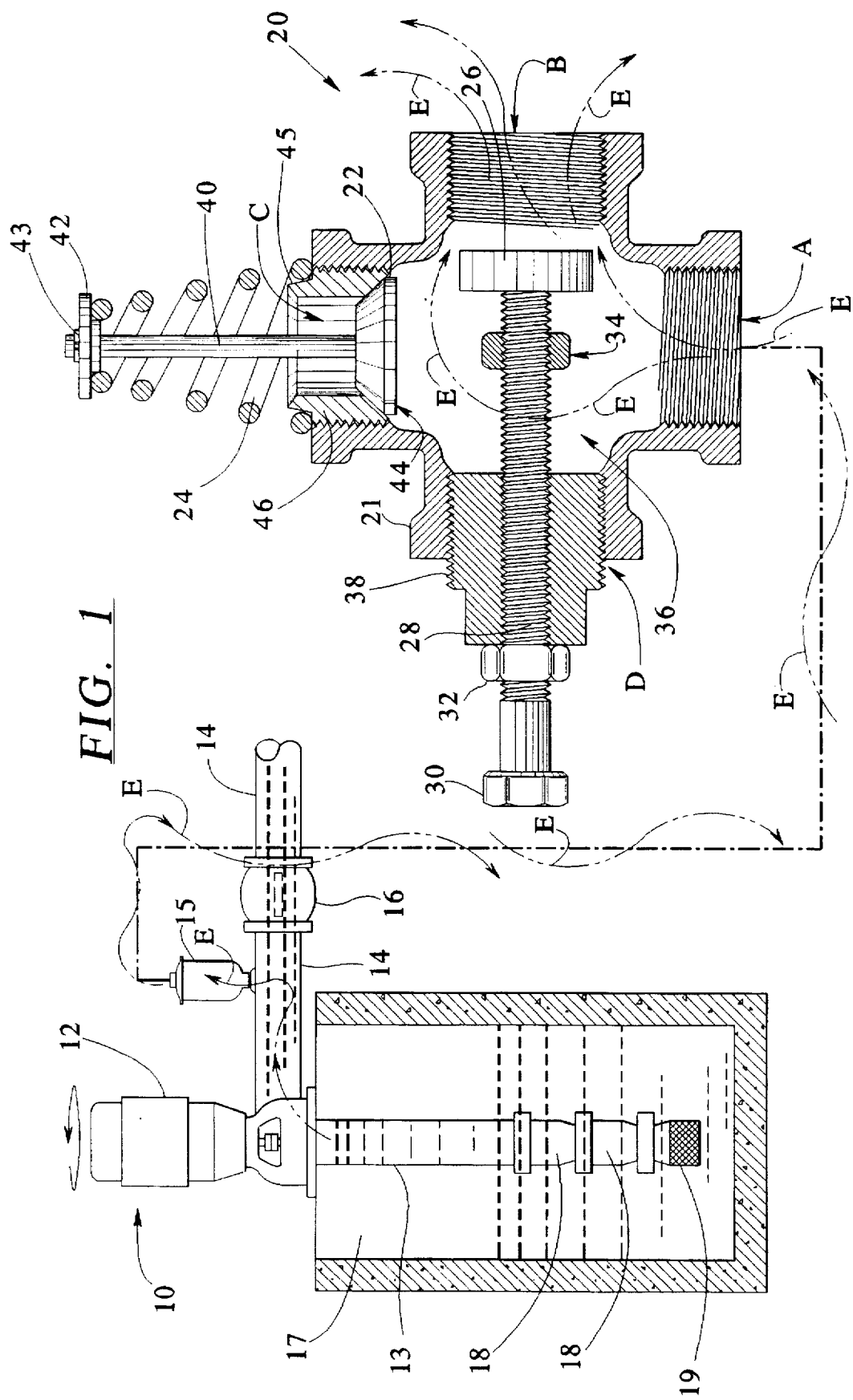
FIG. 1 is an elevational view, partially in cross section, of a vertical turbine pump discharge piping installation including an air/vacuum valve in which an embodiment of a throttling device of the present invention may be used.

FIG. 1 illustrates a typical vertical turbine pump discharge piping installation having the air/vacuum valve throttling device of the present invention mounted to an air/vacuum valve. Specifically, the vertical turbine pump discharge piping installation is referenced 10. The vertical turbine pump discharge piping installation 10 includes a vertical turbine pump 12 connected to a pump column 13 and a horizontal discharge pipe 14. An air/vacuum valve 15, which may include a float valve to allow for the passage of air, but to prevent the passage of water, as is standard in the art, is connected to the horizontal pipe 14 between the pump 12 and a check valve 16. The check valve 16 prevents a back flowing of water from discharge pipe 14 after the pump 12 has been turned off, and the air/vacuum valve 15 prevents the formation of a vacuum in the section of the discharge pipe 14 between the pump 12 and the check valve 16. The pump column 13 extends downwardly into a fluid-containing well 17. The pump column 13 is also connected to a plurality of impeller housings 18. At the bottom of the pump column 13, beyond the impeller housings 18, is a pipe end strainer 19. Thus, the vertical turbine pump discharge piping installation 10 pumps fluid from the well 17 up through the pump column 13 and out the horizontal discharge pipe 14.

Figure 2:
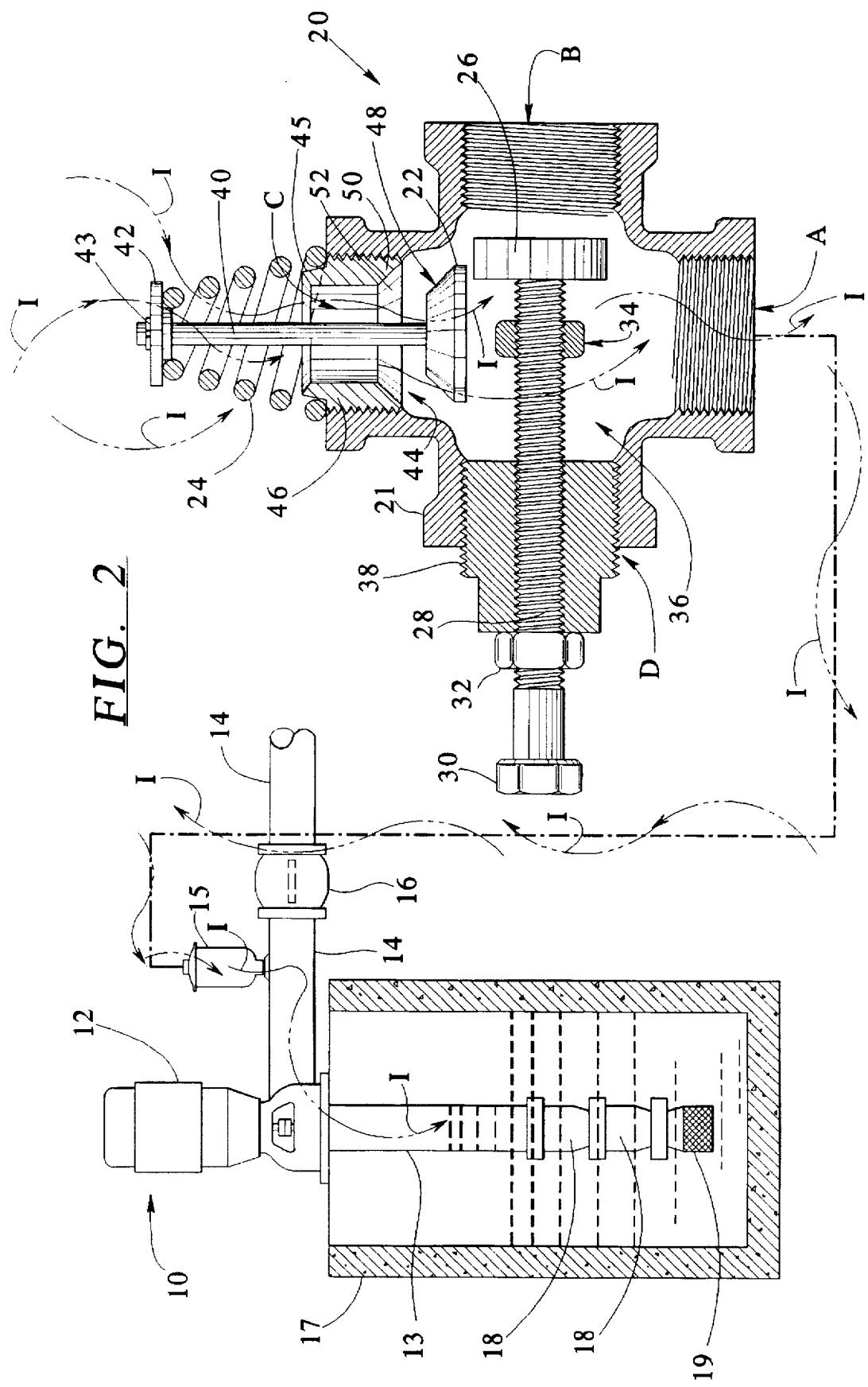
FIG. 2 is an elevational view, partially in cross section, of a vertical turbine pump discharge piping installation including an air/vacuum valve in which an embodiment of a throttling device of the present invention may be used.

The air/vacuum valve 15 is connected to the horizontal pipe 14 as illustrated in FIGS. 1 and 2. An improved air/vacuum valve throttling device 20 for the air/vacuum valve 15 is illustrated in cross section in FIGS. 1 and 2. The throttling device 20 is connected to the top of the air/vacuum valve 15 as indicated by the dot-dash line. The throttling device 20 comprises a body 21 having ports A, B, C and D.

FIG. 1 illustrates the operation of the throttling device 20 and the corresponding air flow conditions during a pump start up. During a start up of the pump 12, air in the pump column 13 is exhausted into the throttling device 20 through port A and out of the throttling device 20 through port B. The exhaust air is indicated by the arrows labeled E. Port C is normally closed by a plug 22 held in place by a conical spring 24. The rate at which air is exhausted through port B is adjusted by setting the position of a plug 26 relative to port B by using a threaded bolt 28. The diameter of the plug 26 is intentionally less than the inner diameter of port B so that if the throttling device 20 is overadjusted in the throttle position, air would still be exhausted through port B. The threaded bolt 28 has a hex-head 30 and an adjustment nut 32 located on the exterior of the throttling device 20. The adjustment of the position of the plug 26 in an opening direction is limited by a lock nut 34 located in an interior 36 of the throttling device 20. The adjustment is limited by the lock nut 34 so that the plug 26 is always positioned vertically below the plug 22, thereby providing a physical limit to the downward travel of the plug 22. The adjustment nut 32 is used to lock the position setting of the plug 26 by jamming the threads of the bolt 28 against the threads of a square head bushing 38 which is mounted in port D. Alternatively, port D and bushing 38 could be replaced by a threaded passage extending through a solid wall of the body 21.

FIG. 2 illustrates the same pumping installation 10 as shown in FIG. 1. However, FIG. 2 shows the operation of the throttling device 20 upon shut down of the pump 12, wherein arrows labeled I indicate intake of air into the pump column 13. When the pump 12 is shut down, a low pressure condition occurs at port A which causes a downward force on plug 22. The plug 22 is carried on a stem 40 which has a washer 42 and a C-shaped spring clip or a retainer ring 43 at its opposite end. The spring clip 43 can be snapped into a circumferntial groove (not shown) on the stem 40. An additional advantage of the present invention is that the conical shape of the spring 24 enhances the spring characteristics. The spring 24 also prevents debris from entering the body 21 through port C. The conical spring 24 also provides greater flow area for use with the throttling device 20 as well as providing means for centering the plug 40 in port C. The washer 42 keeps the spring 24 centered on the body 21 and controls the compression of the spring 24. The retainer ring 43 captures the washer 42 on the stem 40. As a result of the downward force on the plug 22, the stem 40 and washer 42 move downwardly which compresses the spring 24. A passageway 44 is formed in the interior 36 of the body 21 so that unrestricted atmospheric air enters the throttle device 20 through the air intake port C. The conical spring 24 is retained by an outer conical register 45 on a seat 46 that centers the spring 24 around port C. Since the spring 24 is conical-shaped and has a smaller diameter at the top, it in turn centers the stem 40 in port C. In addition, in the embodiment illustrated in FIGS. 1 and 2, the plug 22 is shown with a chamfered edge 48. The chamfered edge 48 fits into a chamfered port bushing 50 to form a tight seal therebetween. The chamfered port bushing 50 also has a seat 52. In this embodiment, the shape of the seat 52 is a chamfer to provide an enhanced flow area for the reverse flow port C.

The plugs 22, 26 are shown as a round plug. The invention, however, is not limited to such a shape, and the plugs may be chamfered, rounded, elongated, etc. depending on the various openings and flow characteristics desired. Elastomeric coatings can also be used to enhance the seat tightness of the device. The shapes shown, therefore, are simply illustrative, and do not comprise all possible shapes for the plugs.

Figure 3:
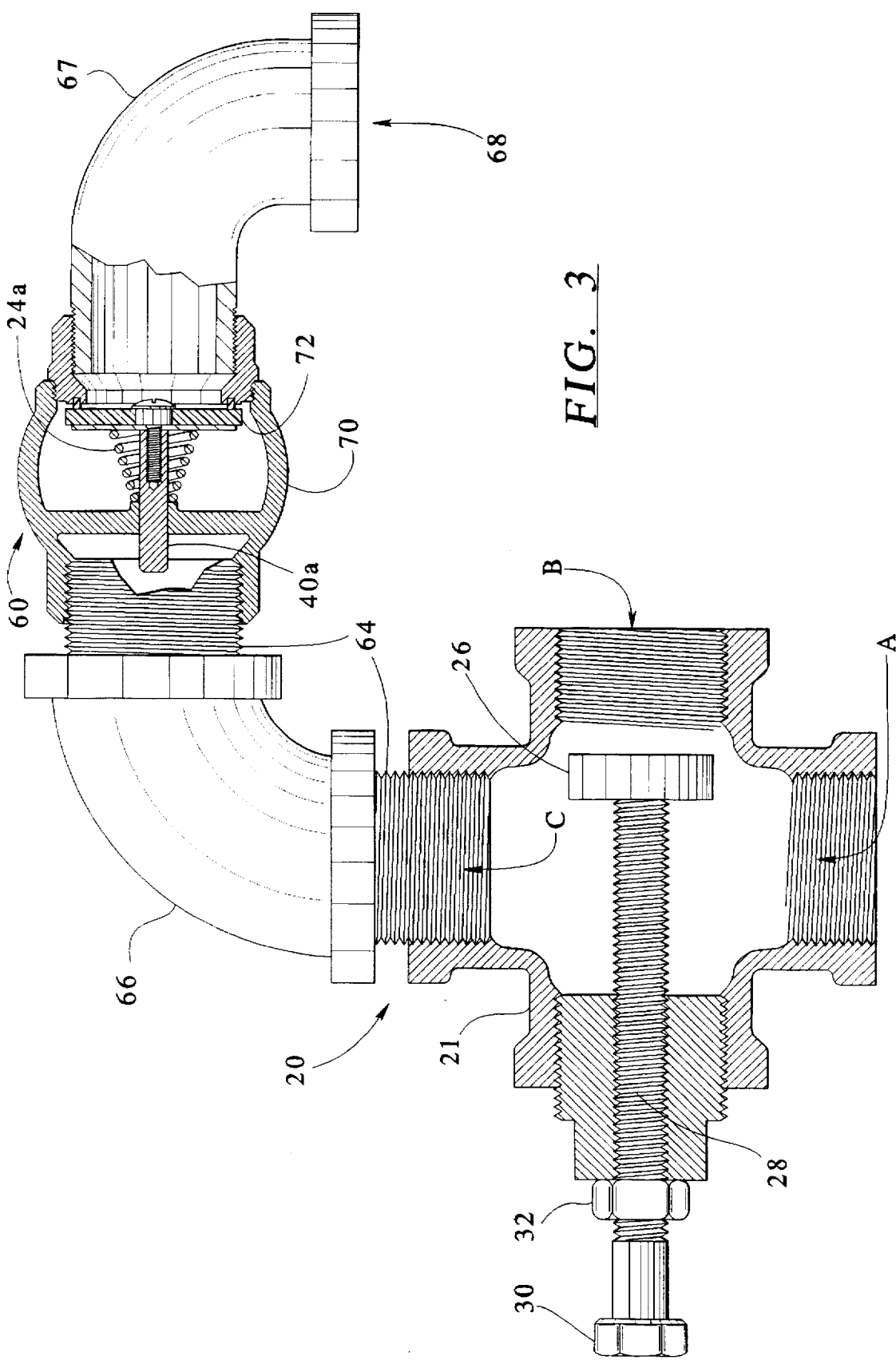
FIG. 3 is another embodiment, partially in cross section, of an air/vacuum valve throttling device of the present invention.

In another embodiment of the present invention shown in FIG. 3, wherein like numerals represent like parts, a conventional vacuum breaker valve 60 is mounted on top of the body 21 using a first pipe elbow 66 and piping nipples 64. A second pipe elbow 67 is connected to the vacuum breaker valve 60. The pipe elbow 67 has an air inlet port 68. When a low pressure condition occurs at port A, air flows into the air inlet 68 and travels through the conventional vacuum breaker valve 60 and into the top port C of the body 21 of the throttling device 20. When positive pressure occurs at port A, the valve 60 remains closed and the pressurized air is exhausted out the outlet port B. The downward orientation of the air inlet 68 prevents the entry of debris into the valve 60.

As illustrated in FIG. 3, the vacuum breaker valve 60 has a body 70 which mates to the piping nipples 64. The vacuum breaker valve 60 also has a rod 40a and a spring 24a encircling the rod 40a. The spring 24a resiliently urges a valve plug 72 against a seat in body 70 to close off the vacuum breaker valve 60 during the operation of the throttling device 20.

Figure 4:
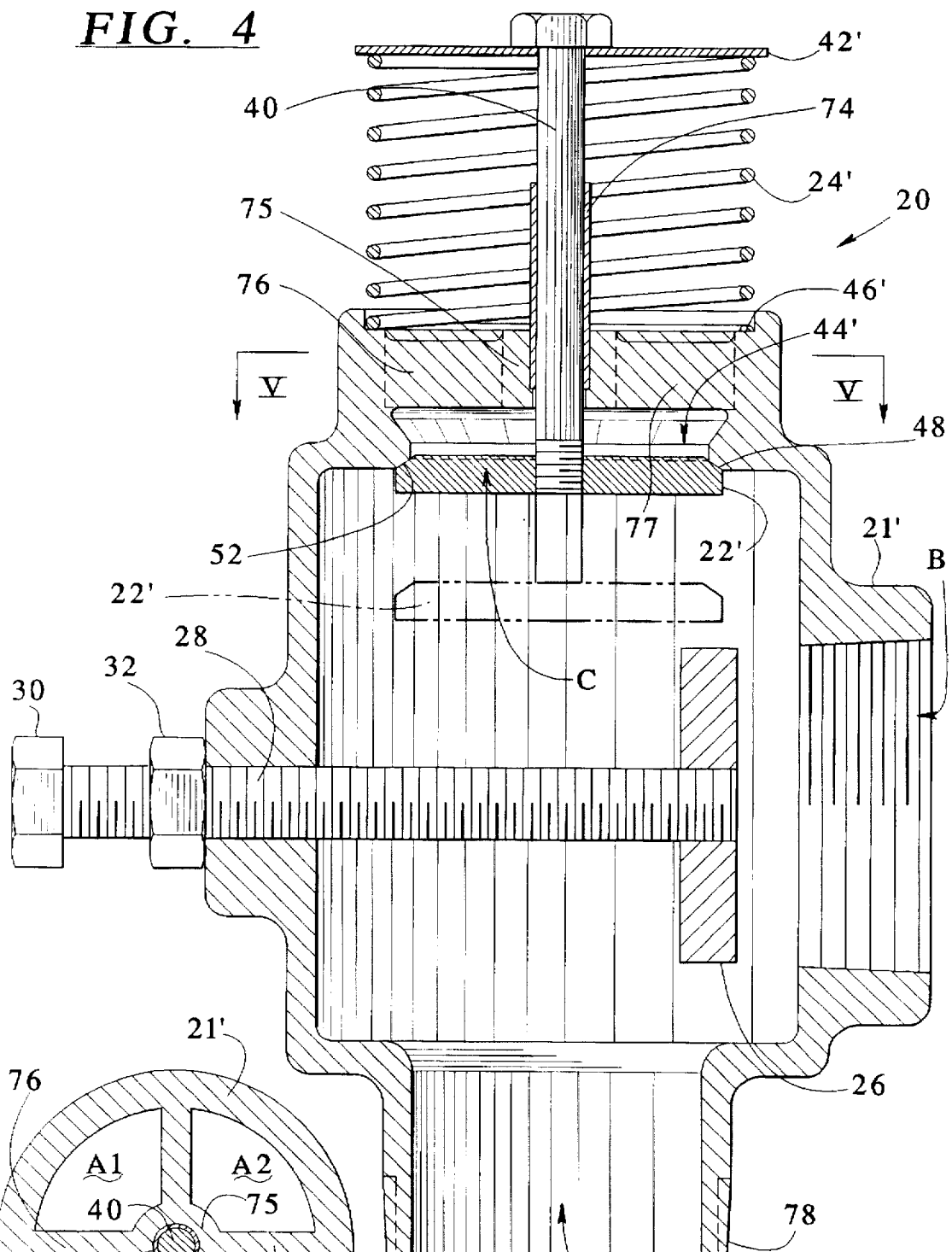
FIG. 4 is another embodiment, partially in cross section, of an air/vacuum valve throttling device with full size vacuum port of the present invention.

In another embodiment of the present invention shown in FIG. 4, wherein like numerals represent like parts, a threaded passage is provided in a body 21' to support the threaded bolt 28. Also in this embodiment, a passageway 44' is equal to the full valve size by means of an expanded diameter 77 which contains ribs 76 and a centering hub 75 to guide the stem 40. The bushing 74 is affixed to the hub 75 to concentrically guide the stem 40 during operation and limit the stroke of a plug 22'. The plug 22' is shown in seated position (solid) and unseated position (dashed). The washer 42' is of a large diameter to act as a hood to prevent dirt from falling into the valve and to capture the spring 24'. A recess or seat 46' is provided to center spring 24' in the body 21'. Threads 78 are male to mate with the air/vacuum valve 15 equipped with female threads on its outlet. Alternately female threads can be provided to mate with male threads provided on the outlet of a valve 15.

Figure 5:
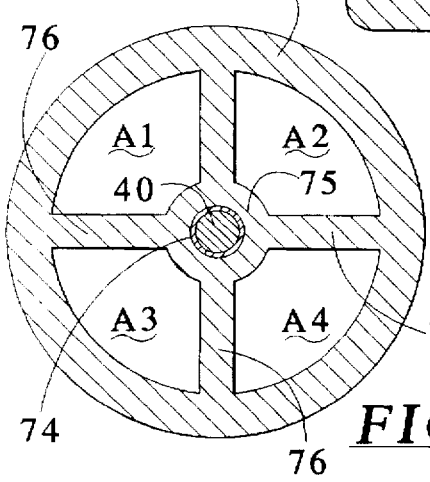
FIG. 5 is a sectional view taken generally along V—V of FIG. 4.

FIG. 5 illustrates the ribs 76 connecting the centering hub 75. By using the ribs an increase flow area consisting of quadrants A1, A2, A3, A4 is provided.

Thus, the air/vacuum valve throttling device 20 as described above comprises a separate port C for a reverse flow that can be used so that the throttling device operates in the forward and in the reverse mode without restriction.

The three exemplary embodiments illustrated and described above have a reverse flow port on the top of the valve which provides at least three distinctive advantages over previous devices. First, a greater volume of free air can be admitted directly into the device instead of piping will not prevent the valve from admitting air. Finally, the operation of the valve can be monitored through simple observation to determine if service is needed.

As is apparent from the foregoing specification, the invention is susceptible of being embodied with various alterations and modifications which may differ particularly from those that have been described in the preceding specification and description. It should be understood that I wish to embody within the scope of the patent warranted hereon, all such modifications as reasonably and properly come within the scope of my contribution to the art.

I claim:

1. A throttling device for mounting to an air inlet/outlet port of an air/vacuum valve, comprising:
    a single body having a hollow interior with a plurality of ports in communication with each other through said interior;
    a first of said ports configured to allow for the passage of air into and out of said air/vacuum valve through said interior of said body and said first port;
    a second of said ports configured to permit passage of air into and out of said interior;
    a first restriction device adjustably positionable relative to said second of said ports to allow for a controlled rate of air flow through said second port at least out of said interior;
    a third of said ports configured to permit passage of air into and out of said interior independent of said second of said ports; and
    a second restriction device movably positioned relative to said third of said ports to allow for air flow through said third port only into said interior.

2. The throttling device of claim 1, further comprising:
    a support member associated with the third of said ports, said support member having an opening to allow a portion of the second restriction device to pass therethrough; and
    means for resiliently centering the second restriction device in the third of said ports.

3. The throttling device of claim 2, wherein the means for resiliently centering the second restriction device in the third of said ports is a spring retained by the second restriction device and biased against the support member.

4. The throttling device of claim 2, further comprising:
    means for sealing the second restriction device to the support member to prevent outflow of air through the third of said ports.

5. The throttling device of claim 2, wherein the second restriction device is a plug carried on a rod.

6. The throttling device of claim 5, wherein the second restriction device is completely contained interior of the single body.

7. The throttling device of claim 5, wherein the means for resiliently centering the second restriction device comprises a spring located outside the single body and arranged to encircle a portion of the rod and a retaining means for urging the spring against the support member.

8. The throttling device of claim 7, wherein the plug on the rod has a chamfer and the support member comprises a bushing having a cooperatively-shaped seat which forms a seal with the chamfer on the plug when the spring is in an extended position and forms a passageway from the third of said ports to the interior of the single body when the spring is compressed.

9. The throttling device of claim 7, wherein the spring is a conical spring.

10. The throttling device of claim 1, wherein the first restriction device comprises a plug carried on a shaft.

11. The throttling device of claim 10, wherein the shaft is threadedly connected to the single body to provide adjustability of the position of the plug.

12. The throttling device of claim 10, wherein the shaft extends exterior of the single body.

13. The throttling device of claim 10, further comprising:
    means for adjusting the position of the plug on the shaft including a lock nut mounted on the shaft at a distance from the plug interior of the single body.

14. The throttling device of claim 1, wherein said second restriction device comprises a plug within said single body and carried on a shaft extending outwardly of said single body, said third port comprising an opening through said single body, and said second restriction device comprises a spring surrounding said shaft and a washer carried on said shaft and capturing said spring between said single body and said washer, said washer having a size at least equal to a size of said opening, to prevent debris from falling into said opening.

15. The throttling device of claim 1, wherein said third port comprises a substantially circular opening divided by ribs which support a center hub at a center of said circular opening, said hub in the form of an annular ring, and said second restriction device comprises a plug carried on a shaft, said plug within said single body, and said shaft penetrating said center hub and extending out of said, single body said plug sized to close said substantially circular opening and be moveable therefrom to allow air flow in an inflow direction.

16. The throttling device of claim 15 further comprising a guide bushing fixed into said aperture of said center hub, said guide bushing arranged to guide movement of said shaft in an opening and closing direction of said plug to said substantially circular opening.

17. The throttling device of claim 1, wherein said third port comprises an opening through said single body and said second restriction device comprises a plug carried on a shaft, said shaft penetrating to an outside of said single body, as a plug moveable to close said opening and open said opening for inflow of air, and a cylindrical bushing penetrating through said single body and closely guiding said shaft for reciprocal movement thereof.

18. The throttling device according to claim 1, wherein said first restriction device comprises a plug carried on a threaded shaft and said single body comprises a threaded opening for receiving said threaded shaft for adjustably positioning said plug into said second port.

19. A throttling device for mounting an air inlet/outlet port of an air/vacuum valve, comprising:
    a single body having a hollow interior with a plurality of ports in communication with each other through said interior;
    a first of said ports configured to allow for the passage of air into and out of said air/vacuum valve through said interior of said body and said first port;
    a second of said ports configured to permit passage of air into and out of said interior;
    a first plug adjustably positionable relative to said second of said ports to allow for a controlled rate of air flow through said second port at least out of said interior;
    a third of said ports configured to permit passage of air into and out of said interior independent of said second of said ports; and a second plug adjustably positionable relative to said third of said ports to allow for an unrestricted flow of air through said third port only into said interior.

20. The throttling device of claim 19, wherein the first plug and the second plug are arranged perpendicular to each other.

21. The throttling device according to claim 19, wherein said second plug is adjustably positionable relative to said third port to prevent any flow of air through said third port in the outflow direction.

22. The throttling device of claim 19, wherein said third port further comprises means for preventing debris from entering said third port.

* * * * *